(12) United States Patent
Dylewski, II et al.

(10) Patent No.: US 11,724,582 B2
(45) Date of Patent: Aug. 15, 2023

(54) PINCH LATCH ASSEMBLY

(71) Applicant: Truck Accessories Group, LLC, Elkhart, IN (US)

(72) Inventors: Eugene A. Dylewski, II, Granger, IN (US); Christopher David Mattison, Granger, IN (US)

(73) Assignee: Leer Group, Elkhart, IN (US)

( * ) Notice: Subject to any disclaimer, the term of this patent is extended or adjusted under 35 U.S.C. 154(b) by 57 days.

(21) Appl. No.: 17/537,613

(22) Filed: Nov. 30, 2021

(65) Prior Publication Data
US 2022/0176786 A1    Jun. 9, 2022

Related U.S. Application Data

(60) Provisional application No. 63/120,976, filed on Dec. 3, 2020.

(51) Int. Cl.
*B60J 7/14* (2006.01)
*B60J 7/16* (2006.01)

(52) U.S. Cl.
CPC ............. *B60J 7/141* (2013.01); *B60J 7/1607* (2013.01)

(58) Field of Classification Search
CPC ....... B60J 7/085; B60J 7/10; B60J 7/14; B60J 7/141; B60J 7/16; B60J 7/1607
USPC .......................... 296/100.02, 100.06, 100.07
See application file for complete search history.

(56) References Cited

U.S. PATENT DOCUMENTS

| | | |
|---|---|---|
| 528,762 A | 11/1894 | Conner |
| 1,359,030 A | 11/1920 | Cabana |
| 1,494,161 A | 5/1924 | Fairbanks |
| 1,524,006 A | 1/1925 | Dodge |
| 1,653,352 A | 12/1927 | Faudi |
| 1,740,971 A | 12/1929 | Corlett |
| 1,765,775 A | 6/1930 | Schenck |
| 2,104,099 A | 1/1938 | Ponce |
| 2,292,675 A | 8/1942 | Thiry |
| 2,292,676 A | 8/1942 | Thiry |

(Continued)

FOREIGN PATENT DOCUMENTS

| | | |
|---|---|---|
| CA | 2823430 A1 | 2/2014 |
| CN | 105416157 B | 5/2019 |

(Continued)

OTHER PUBLICATIONS

International Search Report, PCT/US2020/042049, filing date Jul. 15, 2020; dated Sep. 24, 2020. Written Opinion, PCT/US2020/042049, filing date Jul. 15, 2020; dated Sep. 24, 2020.

(Continued)

*Primary Examiner* — Jason S Daniels
(74) *Attorney, Agent, or Firm* — Barnes & Thornburg LLP

(57) ABSTRACT

A tonneau cover for use on a cargo box of a pick-up truck is provided. The tonneau cover may include at least one panel and a latching assembly located on the at least one panel. The latching assembly selectively secures and releases the at least one panel. The latching assembly includes at least one shoe. The at least one shoe is configured for moving at least a portion of the latching assembly to release the at least one panel. The at least one shoe is movable between an extended use position and a retracted stowed position with respect to the at least one panel. And the at least one shoe is spring biased to its extended use position.

20 Claims, 8 Drawing Sheets

(56) References Cited

U.S. PATENT DOCUMENTS

| | | |
|---|---|---|
| 2,316,587 A | 4/1943 | Irigai |
| 2,424,409 A | 7/1947 | Michel |
| 2,489,658 A | 11/1949 | Miller |
| 2,534,501 A | 12/1950 | Coleman |
| 2,619,971 A | 12/1952 | Giordano |
| 2,792,587 A | 5/1957 | Rose et al. |
| 2,810,147 A | 10/1957 | Aman |
| 2,820,743 A | 1/1958 | Mention et al. |
| 2,823,430 A | 2/1958 | Morton |
| 2,834,605 A | 5/1958 | Mccollough |
| 2,849,199 A | 8/1958 | Lucien |
| 2,853,592 A | 9/1958 | Gravet |
| 2,907,302 A | 10/1959 | Raszl |
| 2,913,746 A | 11/1959 | Schaich |
| 2,923,516 A | 2/1960 | Crump et al. |
| 2,947,091 A | 8/1960 | Lola |
| 2,954,008 A | 9/1960 | Bullard |
| 2,955,289 A | 10/1960 | Winegard |
| 2,961,988 A | 11/1960 | Wood |
| 2,963,047 A | 12/1960 | Monahan |
| 2,963,379 A | 12/1960 | Kaupp et al. |
| 2,963,381 A | 12/1960 | Leimbacher |
| 2,967,963 A | 1/1961 | Ballard et al. |
| 2,982,560 A | 5/1961 | Santoro |
| 2,982,571 A | 5/1961 | Hoyer |
| 2,982,960 A | 5/1961 | Shanks |
| 2,990,623 A | 7/1961 | Keyser, Jr. |
| 2,991,724 A | 7/1961 | Crowl |
| 2,991,735 A | 7/1961 | Womer |
| 3,002,379 A | 10/1961 | Hurley |
| 3,002,941 A | 10/1961 | Peterson |
| 3,003,299 A | 10/1961 | Smith et al. |
| 3,004,864 A | 10/1961 | Hanink |
| 3,007,759 A | 11/1961 | Dickens |
| 3,012,799 A | 12/1961 | Mayne |
| 3,018,906 A | 1/1962 | Franklin |
| 3,081,417 A | 3/1963 | Collier |
| 4,273,377 A | 6/1981 | Alexander |
| 4,547,014 A | 10/1985 | Wicker |
| 4,563,034 A | 1/1986 | Lamb |
| 4,639,034 A | 1/1987 | Amos |
| 4,717,196 A | 1/1988 | Adams |
| 4,747,441 A | 5/1988 | Apolzer et al. |
| 4,838,602 A | 6/1989 | Nett |
| 4,844,531 A | 7/1989 | Kooiker |
| 4,913,616 A | 4/1990 | Dunn |
| 4,920,592 A | 5/1990 | Scott |
| 4,946,217 A | 8/1990 | Steffens et al. |
| 5,207,262 A | 5/1993 | Rushford |
| 5,275,458 A | 1/1994 | Barben et al. |
| 5,310,238 A | 5/1994 | Wheatley |
| 5,322,336 A | 6/1994 | Isler |
| 5,330,246 A | 7/1994 | Bernardo |
| 5,350,213 A | 9/1994 | Bernardo |
| 5,524,953 A | 6/1996 | Shaer |
| 5,553,652 A | 9/1996 | Rushford |
| 5,595,417 A | 1/1997 | Thoman et al. |
| 5,636,893 A | 6/1997 | Wheatley et al. |
| 5,653,491 A | 8/1997 | Steffens et al. |
| 5,655,808 A | 8/1997 | Wheatley |
| 5,688,017 A | 11/1997 | Bennett |
| 5,857,729 A | 1/1999 | Bogard |
| 5,860,691 A | 1/1999 | Thomsen et al. |
| 5,931,521 A | 8/1999 | Kooiker |
| 5,975,618 A | 11/1999 | Rippberger |
| 6,053,558 A | 4/2000 | Weldy et al. |
| 6,106,051 A | 8/2000 | Miskowic |
| 6,170,900 B1 | 1/2001 | Kooiker |
| 6,196,602 B1 | 3/2001 | Esplin |
| 6,203,086 B1 | 3/2001 | Dirks et al. |
| 6,217,102 B1 | 4/2001 | Lathers |
| 6,227,602 B1 | 5/2001 | Bogard |
| 6,256,844 B1 | 7/2001 | Wheatley |
| 6,273,491 B1 | 8/2001 | Bath et al. |
| 6,382,698 B1 | 5/2002 | Harrell |
| 6,422,635 B1 | 7/2002 | Steffens et al. |
| 6,427,500 B1 | 8/2002 | Weinerman et al. |
| 6,435,594 B1 | 8/2002 | Ekonen et al. |
| 6,499,791 B2 | 12/2002 | Wheatley |
| 6,543,835 B2 | 4/2003 | Schmeichel et al. |
| 6,543,836 B1 | 4/2003 | Wheatley |
| 6,547,311 B1 | 4/2003 | Derecktor |
| 6,568,740 B1 | 5/2003 | Dimmer |
| 6,712,418 B1 | 3/2004 | Lathers |
| 6,752,449 B1 | 6/2004 | Wheatley |
| 6,764,125 B2 | 7/2004 | Bacon |
| D494,763 S | 8/2004 | Fenton et al. |
| 6,811,203 B2 | 11/2004 | Wheatley |
| 6,883,855 B2 | 4/2005 | Chverchko et al. |
| D507,112 S | 7/2005 | Fenton et al. |
| 6,923,398 B2 | 8/2005 | Kosugi et al. |
| 7,008,000 B1 | 3/2006 | Schmeichel |
| 7,011,284 B2 | 3/2006 | Melius |
| 7,040,675 B1 | 5/2006 | Ott et al. |
| 7,066,523 B2 | 6/2006 | Verduci et al. |
| 7,066,524 B2 | 6/2006 | Schmeichel et al. |
| 7,104,586 B2 | 9/2006 | Schmeichel et al. |
| 7,147,265 B1 | 12/2006 | Schmeichel |
| D538,043 S | 3/2007 | Fenton et al. |
| 7,188,888 B2 | 3/2007 | Wheatley et al. |
| 7,258,387 B2 | 8/2007 | Weldy |
| 7,296,837 B2 | 11/2007 | Niedziela et al. |
| 7,318,618 B1 | 1/2008 | Yue |
| 7,320,494 B1 | 1/2008 | Wilson |
| 7,334,830 B2 | 2/2008 | Weldy |
| 7,360,801 B2 | 4/2008 | Breslin et al. |
| 7,384,090 B1 | 6/2008 | Weldy |
| 7,427,095 B2 | 9/2008 | Wheatley |
| 7,445,264 B2 | 11/2008 | Spencer et al. |
| 7,452,015 B1 | 11/2008 | Stock, Jr. |
| 7,484,788 B2 | 2/2009 | Calder et al. |
| 7,484,790 B2 | 2/2009 | Wheatley |
| 7,537,264 B2 | 5/2009 | Maimin et al. |
| 7,566,093 B1 | 7/2009 | Embler et al. |
| 7,604,282 B2 | 10/2009 | Spencer et al. |
| 7,628,442 B1 | 12/2009 | Spencer et al. |
| 7,735,881 B2 | 6/2010 | Steffens et al. |
| D620,877 S | 8/2010 | Rusher et al. |
| 7,793,894 B1 | 9/2010 | Olsen et al. |
| 7,815,235 B2 | 10/2010 | Hayashi et al. |
| 7,815,239 B1 | 10/2010 | Schmeichel et al. |
| 7,823,957 B2 | 11/2010 | Williamson et al. |
| 7,828,361 B1 | 11/2010 | Spencer |
| 7,878,576 B1 | 2/2011 | Embler et al. |
| 7,905,536 B2 | 3/2011 | Yue |
| 7,954,876 B2 | 6/2011 | Kosinski |
| 7,963,585 B2 | 6/2011 | Jones et al. |
| 8,128,149 B1 | 3/2012 | Wolf et al. |
| 8,262,148 B2 | 9/2012 | Rusher et al. |
| 8,348,328 B2 | 1/2013 | Walser et al. |
| 8,480,154 B2 | 7/2013 | Yue |
| 8,511,736 B2 | 8/2013 | Williamson et al. |
| 8,540,302 B2 | 9/2013 | Lenz, Jr. |
| 8,544,708 B2 | 10/2013 | Maimin |
| 8,544,934 B2 | 10/2013 | Maimin et al. |
| 8,573,678 B2 | 11/2013 | Yue |
| 8,585,120 B2 | 11/2013 | Rusher et al. |
| 8,632,114 B2 | 1/2014 | Yue |
| 8,641,124 B1 | 2/2014 | Yue |
| 8,657,358 B2 | 2/2014 | Garska |
| 8,672,388 B2 | 3/2014 | Rusher et al. |
| 8,678,469 B2 | 3/2014 | Hang et al. |
| 8,678,626 B1 | 3/2014 | Hickman |
| 8,814,249 B2 | 8/2014 | Rossi |
| 8,857,230 B1 | 10/2014 | Misner |
| 8,857,887 B1 | 10/2014 | Schmeichel |
| 8,960,764 B2 | 2/2015 | Spencer |
| 8,960,765 B2 | 2/2015 | Facchinello et al. |
| 8,973,969 B1 | 3/2015 | Potter |
| 9,004,571 B1 | 4/2015 | Bernardo et al. |
| 9,033,393 B2 | 5/2015 | Damsi et al. |
| 9,038,531 B1 | 5/2015 | Parshall |
| 9,039,066 B1 | 5/2015 | Yue |
| 9,061,572 B2 | 6/2015 | Potter |

(56) References Cited

U.S. PATENT DOCUMENTS

| | | |
|---|---|---|
| 9,067,481 B2 | 6/2015 | Xu |
| 9,073,417 B1 | 7/2015 | Smith |
| 9,120,413 B2 | 9/2015 | Fink |
| 9,211,834 B2 | 12/2015 | Facchinello et al. |
| 9,249,610 B2 | 2/2016 | Reus |
| 9,254,735 B2 | 2/2016 | Spencer |
| 9,296,285 B2 | 3/2016 | Copp et al. |
| 9,352,698 B2 | 5/2016 | Romanelli |
| 9,353,555 B2 | 5/2016 | Laconte |
| 9,393,855 B2 | 7/2016 | Rohr et al. |
| 9,421,850 B2 | 8/2016 | Shi et al. |
| 9,421,851 B2 | 8/2016 | Kerr, III |
| 9,482,039 B1 | 11/2016 | Xu |
| 9,487,070 B2 | 11/2016 | Xu |
| 9,487,071 B1 | 11/2016 | Yue |
| 9,533,555 B2 | 1/2017 | Facchinello et al. |
| 9,545,835 B2 | 1/2017 | Facchinello et al. |
| 9,555,735 B2 | 1/2017 | Kerr, III |
| 9,566,915 B1 | 2/2017 | Singer |
| 9,597,995 B1 | 3/2017 | Weltikol et al. |
| 9,610,831 B2 | 4/2017 | Shi et al. |
| 9,623,737 B2 | 4/2017 | Facchinello et al. |
| 9,630,479 B2 | 4/2017 | Facchinello et al. |
| 9,643,479 B1 | 5/2017 | Zheng et al. |
| 9,650,085 B2 | 5/2017 | Wilson |
| 9,669,689 B2 | 6/2017 | Steffens et al. |
| 9,676,319 B2 | 6/2017 | Fink |
| 9,682,733 B2 | 6/2017 | Krishnan et al. |
| 9,688,127 B2 | 6/2017 | Hemphill et al. |
| 9,707,833 B2 | 7/2017 | Copp et al. |
| 9,713,950 B1 | 7/2017 | Stoddard, Jr. |
| 9,731,584 B2 | 8/2017 | Hannan et al. |
| 9,738,143 B2 | 8/2017 | Weltikol et al. |
| 9,759,373 B2 | 9/2017 | Hough |
| 9,764,628 B2 | 9/2017 | Facchinello et al. |
| 9,776,562 B2 | 10/2017 | Williamson et al. |
| 9,802,548 B2 | 10/2017 | Wilson |
| 9,815,357 B2 | 11/2017 | Hall |
| 9,815,358 B1 | 11/2017 | Quintus et al. |
| 9,827,838 B2 | 11/2017 | Hannan et al. |
| 9,827,916 B1 | 11/2017 | Singer |
| 9,889,730 B2 | 2/2018 | Chung et al. |
| 9,895,963 B1 | 2/2018 | Spencer |
| 9,895,964 B1 | 2/2018 | Hickey et al. |
| 9,908,391 B2 | 3/2018 | Williamson et al. |
| 9,925,853 B2 | 3/2018 | Aubrey et al. |
| 9,944,216 B2 | 4/2018 | Hannan et al. |
| 9,969,249 B2 | 5/2018 | Spencer et al. |
| 9,981,600 B2 | 5/2018 | Dylewski et al. |
| 10,046,632 B2 | 8/2018 | Dylewski, II et al. |
| 10,059,180 B1 | 8/2018 | Bosco |
| 10,071,618 B2 | 9/2018 | Miyamae et al. |
| D830,282 S | 10/2018 | Schmeichel et al. |
| D830,283 S | 10/2018 | Schmeichel et al. |
| 10,093,159 B1 | 10/2018 | Zichettello et al. |
| 10,112,466 B2 | 10/2018 | Facchinello |
| 10,118,472 B2 | 11/2018 | Lawson |
| 10,131,215 B2 | 11/2018 | Zichettello et al. |
| 10,144,276 B2 | 12/2018 | Facchinello et al. |
| 10,166,930 B2 | 1/2019 | Aftanas et al. |
| 10,183,560 B2 | 1/2019 | Sullivan |
| 10,196,008 B2 | 2/2019 | Ranka et al. |
| 10,239,394 B2 | 3/2019 | Lutzka et al. |
| 10,245,928 B1 | 4/2019 | Facchinello |
| 10,328,778 B2 | 6/2019 | Aubrey et al. |
| 10,363,801 B2 | 7/2019 | Lutzka et al. |
| 10,399,420 B2 | 9/2019 | Rossi |
| 10,406,899 B2 * | 9/2019 | Carter ............... B60J 7/198 |
| 10,414,256 B2 | 9/2019 | Frederick et al. |
| 10,414,257 B2 | 9/2019 | Facchinello |
| 10,800,234 B2 | 10/2020 | Dylewski, II et al. |
| 10,960,745 B2 | 3/2021 | Dylewski, II et al. |
| 2002/0180235 A1 | 12/2002 | Wheatley |
| 2003/0006627 A1 | 1/2003 | Votruba et al. |
| 2004/0217367 A1 | 11/2004 | Kurisu et al. |
| 2006/0102669 A1 | 5/2006 | Fouts et al. |
| 2006/0293108 A1 | 12/2006 | Sun et al. |
| 2007/0210609 A1 | 9/2007 | Maimin et al. |
| 2008/0073473 A1 | 3/2008 | Archer et al. |
| 2008/0129077 A1 | 6/2008 | Weldy |
| 2011/0049316 A1 | 3/2011 | Vitoorapakom et al. |
| 2011/0304114 A1 | 12/2011 | Spanjers |
| 2013/0106122 A1 | 5/2013 | Do et al. |
| 2013/0229027 A1 | 9/2013 | Copp et al. |
| 2013/0257090 A1 | 10/2013 | Schmeichel |
| 2014/0042754 A1 | 2/2014 | Spencer |
| 2014/0152046 A1 | 6/2014 | Facchinello et al. |
| 2014/0167425 A1 | 6/2014 | Dost et al. |
| 2014/0259655 A1 | 9/2014 | Sato |
| 2015/0054300 A1 | 2/2015 | Shi et al. |
| 2015/0123421 A1 | 5/2015 | Combs, II et al. |
| 2016/0070311 A1 | 3/2016 | Geva |
| 2016/0075220 A1 | 3/2016 | Williamson et al. |
| 2016/0107515 A1 | 4/2016 | Shi et al. |
| 2016/0114666 A1 | 4/2016 | Xu |
| 2016/0200375 A1 | 7/2016 | Kerr, III |
| 2016/0200376 A1 | 7/2016 | Kerr, III |
| 2016/0236549 A1 | 8/2016 | Stewart et al. |
| 2016/0236551 A1 | 8/2016 | Hannan et al. |
| 2016/0236555 A1 | 8/2016 | Williamson et al. |
| 2016/0355078 A1 | 12/2016 | Williamson et al. |
| 2017/0120736 A1 | 5/2017 | Lutzka et al. |
| 2017/0144522 A1 | 5/2017 | Facchinello et al. |
| 2017/0144523 A1 | 5/2017 | Facchinello et al. |
| 2017/0197498 A1 | 7/2017 | Facchinello et al. |
| 2017/0217294 A1 | 8/2017 | Lutzka et al. |
| 2017/0240033 A1 | 8/2017 | Dylewski, II et al. |
| 2017/0259655 A1 | 9/2017 | Dylewski, II et al. |
| 2017/0267168 A1 | 9/2017 | Dylewski, II et al. |
| 2017/0291478 A1 | 10/2017 | Hall |
| 2018/0147925 A1 | 5/2018 | Williamson et al. |
| 2018/0147926 A1 | 5/2018 | Shi et al. |
| 2018/0194208 A1 | 7/2018 | Binfet et al. |
| 2018/0201107 A1 | 7/2018 | Lawson |
| 2018/0281576 A1 | 10/2018 | Zichettello et al. |
| 2018/0345768 A1 | 12/2018 | Frederick et al. |
| 2018/0345769 A1 | 12/2018 | Dylewski, II et al. |
| 2019/0092149 A1 | 3/2019 | Facchinello et al. |
| 2019/0100088 A1 | 4/2019 | Facchinello |
| 2019/0126734 A1 | 5/2019 | Dylewski, II et al. |

FOREIGN PATENT DOCUMENTS

| | | |
|---|---|---|
| JP | 2013089870 A | 5/2013 |
| KR | 100666732 B1 | 1/2007 |
| KR | 100837954 B1 | 6/2008 |
| KR | 100841695 B1 | 6/2008 |
| KR | 20080051699 A | 6/2008 |
| KR | 100930936 B1 | 12/2009 |
| KR | 20120006903 A | 1/2012 |
| WO | 2016066132 A1 | 5/2016 |
| WO | 2016070276 A1 | 5/2016 |
| WO | 2018018962 A1 | 2/2018 |

OTHER PUBLICATIONS

International Search Report & Written Opinion; dated: Feb. 14, 2022; PCT/US2021/061413; Filed Dec. 1, 2021.

* cited by examiner

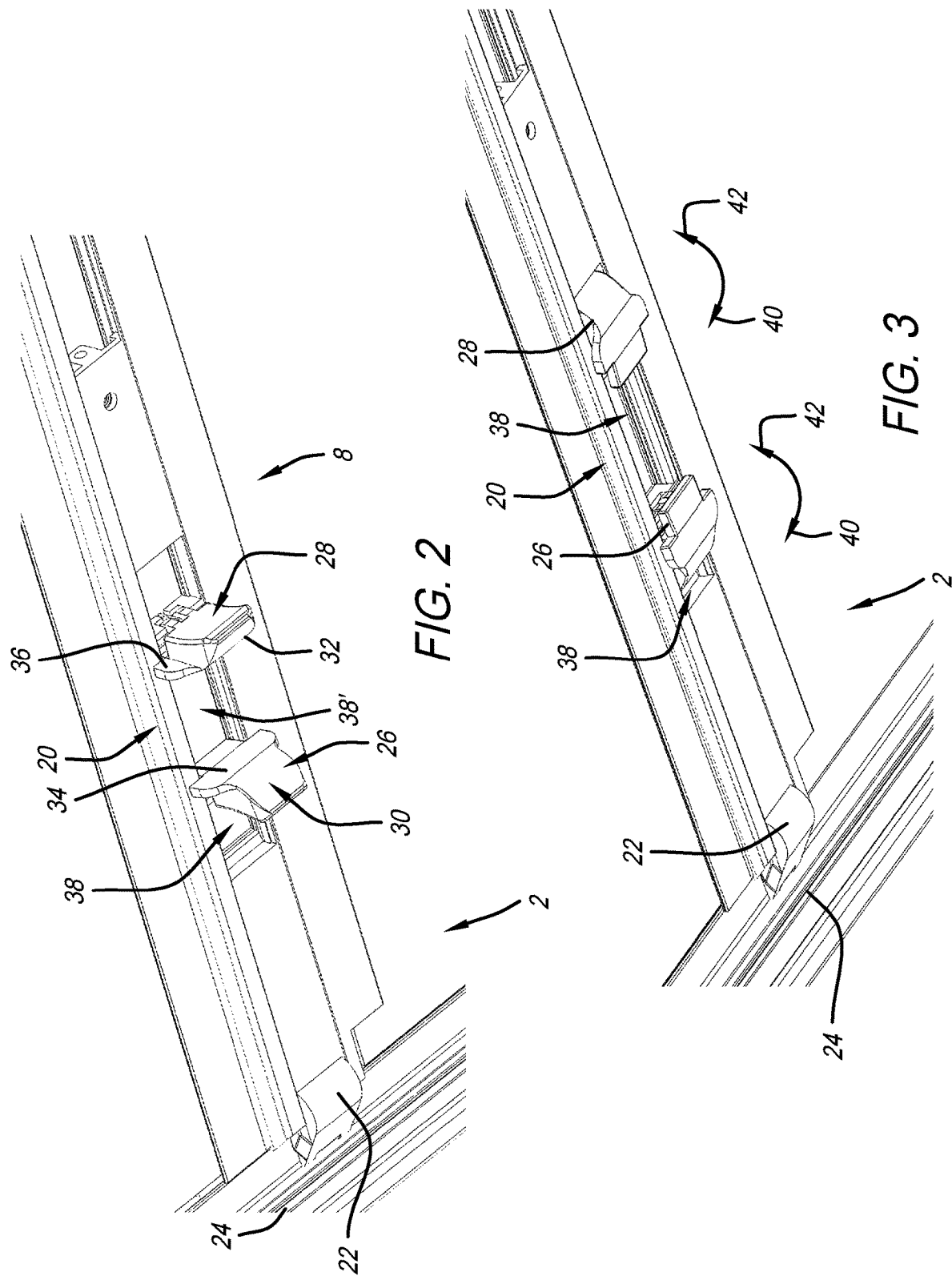

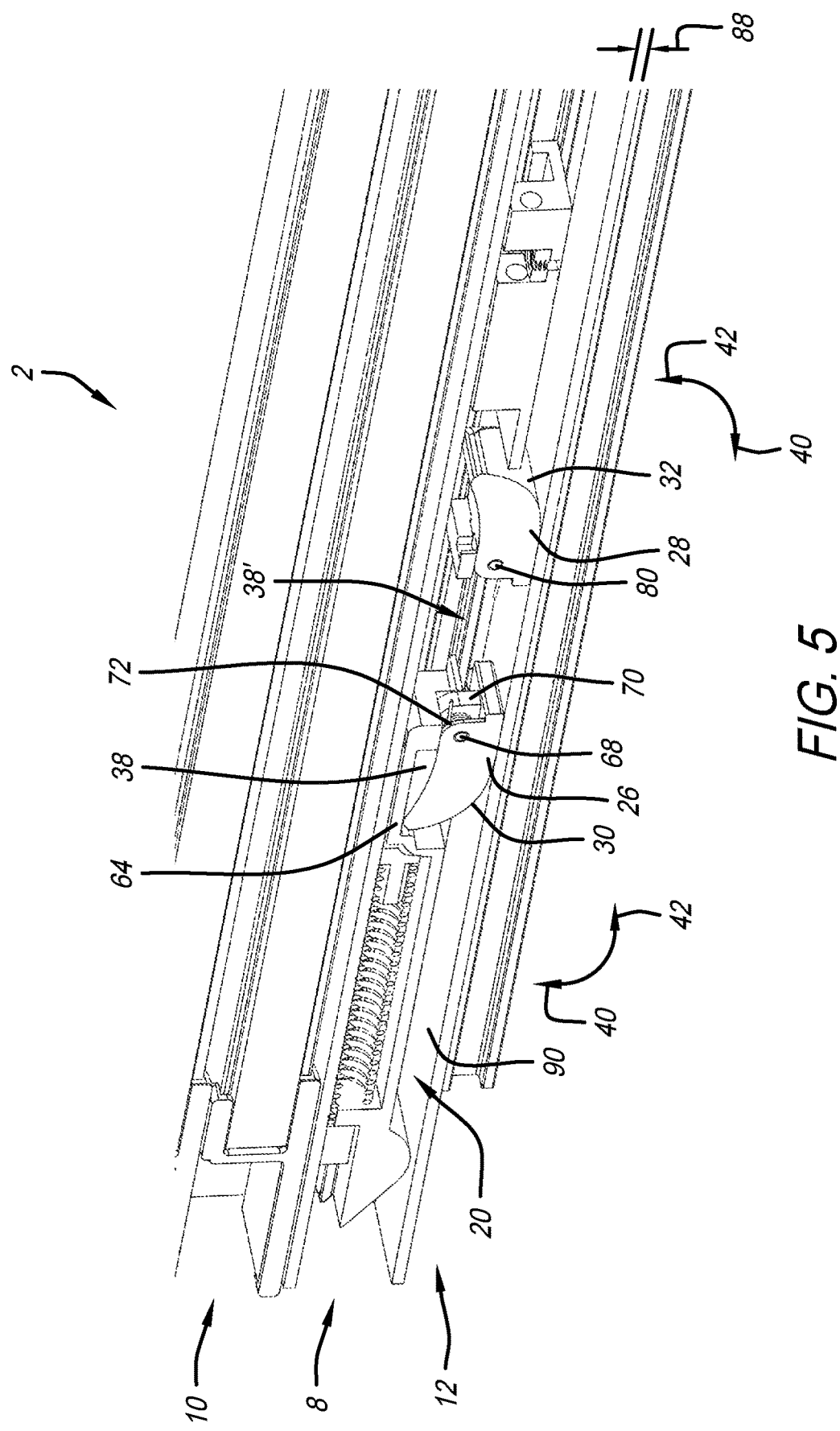

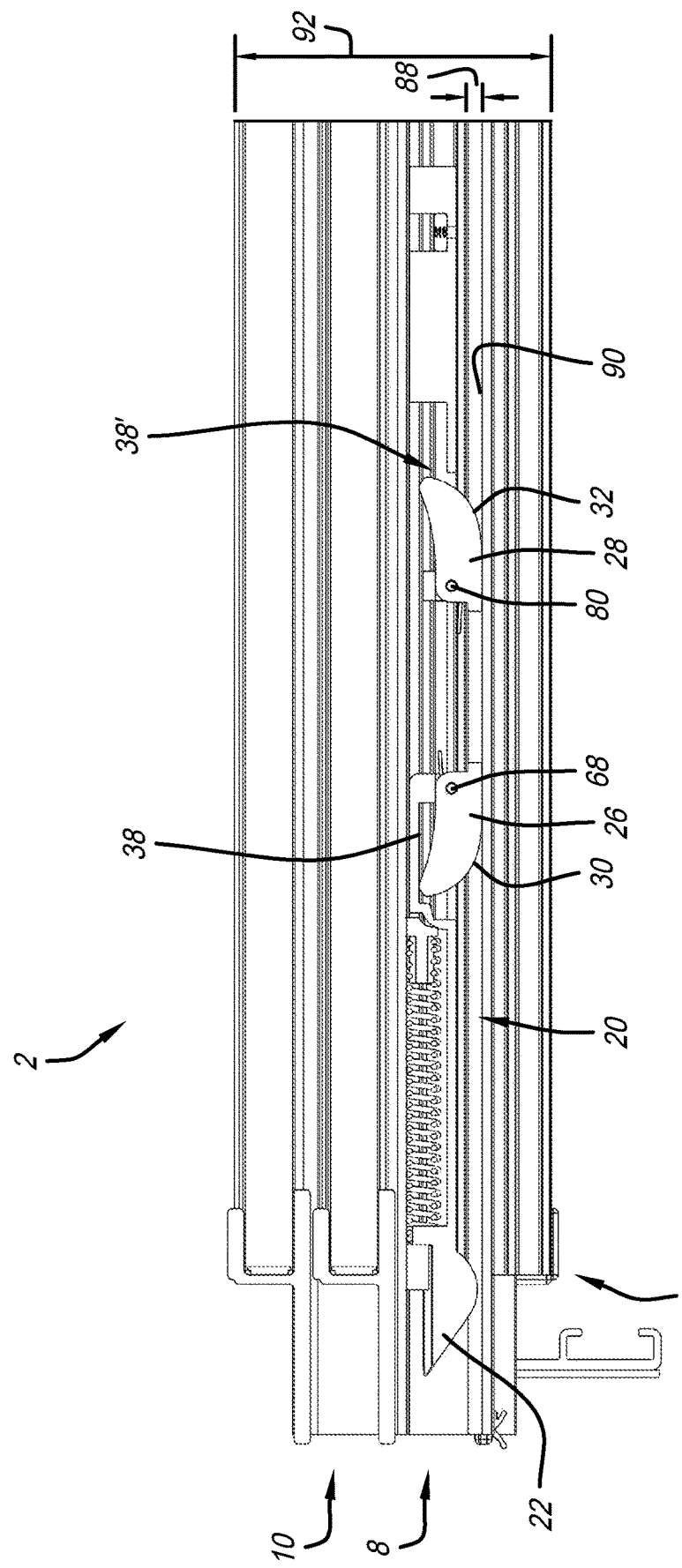

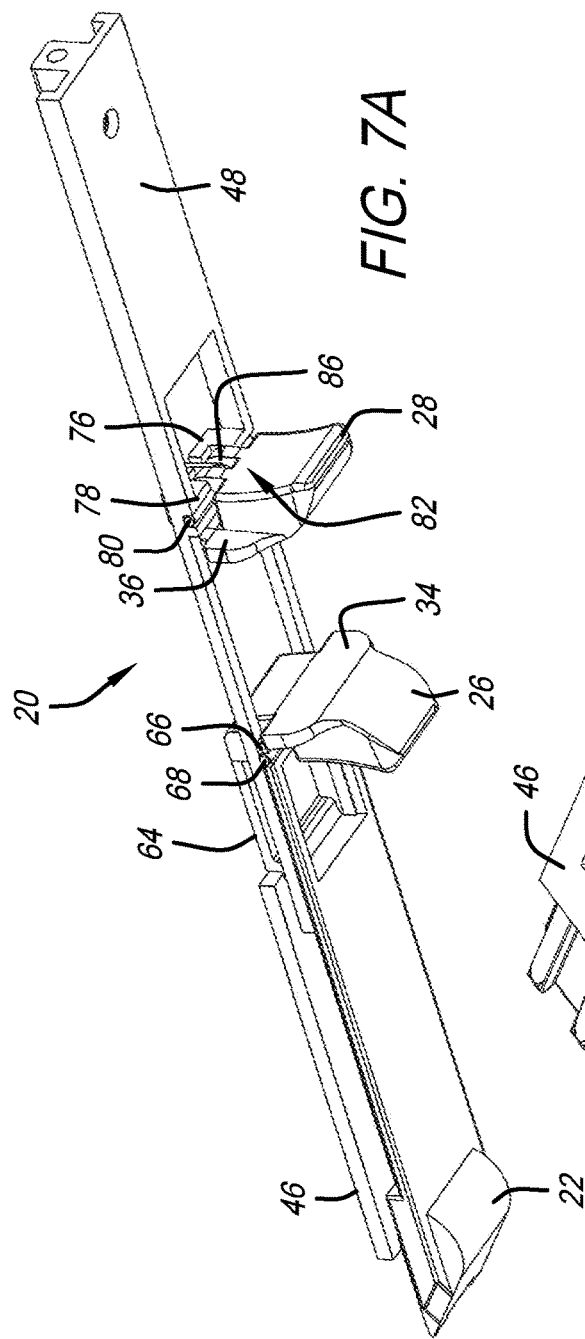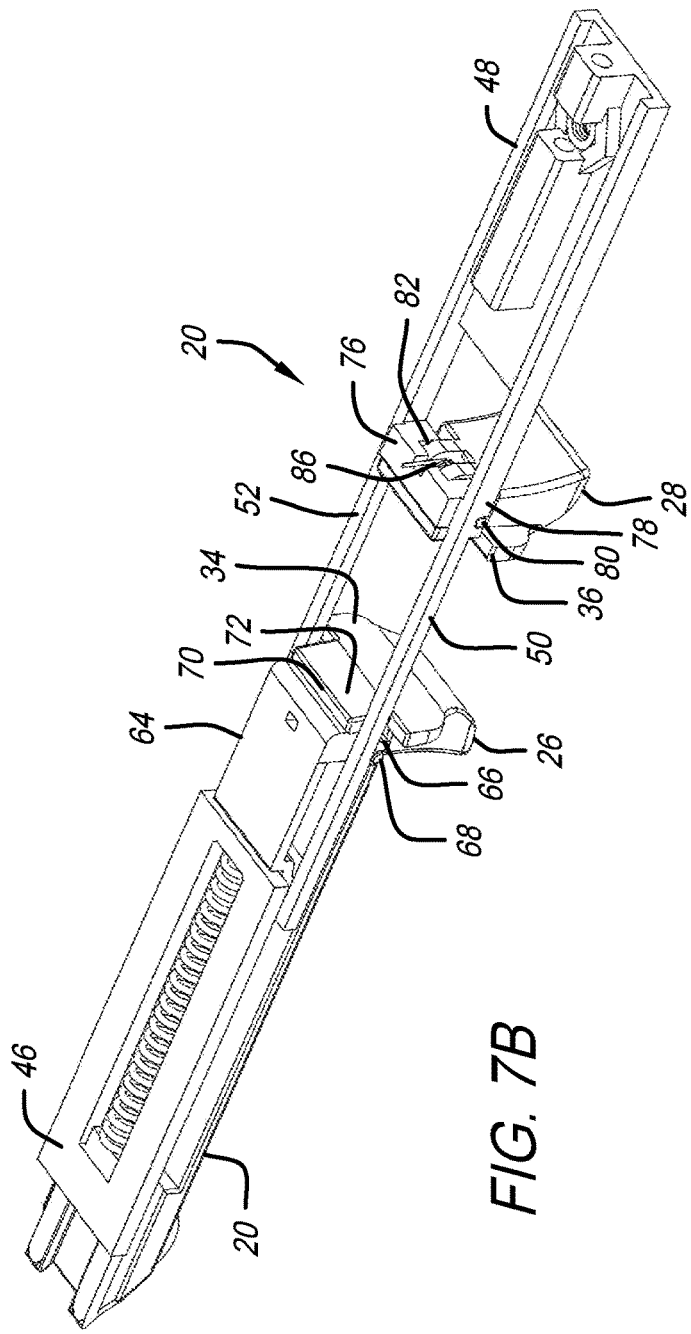

PINCH LATCH ASSEMBLY

RELATED APPLICATIONS

The present Application relates to and claims priority to U.S. Provisional Patent Application, Ser. No. 63/120,976, filed on Dec. 3, 2020, entitled "Pinch Latch Assembly (Gen 3). The subject matter disclosed in that Provisional Application is hereby expressly incorporated into the present Application.

TECHNICAL FIELD AND SUMMARY

The present disclosure relates to truck beds used on pickup trucks and like vehicles, and, in particular, to a truck bed cover also known as a tonneau cover that includes a latching assembly to secure and release the tonneau cover to and from the truck bed.

A tonneau cover is a truck bed cover that provides a covering for a truck bed when used in combination with the truck's sidewalls and tailgate. Covering the bed of a pickup truck helps create a secure compartment where items may be stored out of view when the tailgate is up. Embodiments of a tonneau cover, according to the present disclosure, may provide a pinch latch assembly according the disclosure herein. Illustrative embodiments of tonneau covers and pinch latch assemblies that may employ the subject matter disclosed herein include U.S. patent application Ser. No. 15/342,407, entitled "Tonneau Cover," filed on Nov. 3, 2016, U.S. patent application Ser. No. 15/454,326, entitled "Tonneau Cover With Prop Rod Assembly," filed on Mar. 9, 2017, U.S. Patent Application No. 62/577,920, entitled "Folding Cover Attachment Systems," filed on Oct. 27, 2017, U.S. Patent Application No. 62/750,343, entitled "Vinyl Rolling Cover," filed on Oct. 25, 2018, U.S. patent application Ser. No. 16/101,900, entitled "Tonneau Cover," filed on Aug. 13, 2018, U.S. Patent Application No. 62/743,168, entitled "Tonneau Cover Tie-Down Assembly," filed on Oct. 9, 2018, and U.S. patent application Ser. No. 16/166,474, entitled "Folding Cover Attachment Systems," filed on Oct. 22, 2018, all of the disclosures of which are incorporated expressly herein by reference.

An illustrative embodiment of the present disclosure provides a tonneau cover for use on a cargo box of a pick-up truck. The tonneau cover comprises at least one movable panel and a latching assembly located on the at least one movable panel. The latching assembly selectively secures and releases the at least one movable panel. The latching assembly includes a first shoe and a second shoe. The first and second shoes are configured for moving at least a portion of the latching assembly to release the at least one movable panel. Each of the first and second shoes are located on an underside of the at least one movable panel. Each of the first and second shoes are movable between an extended use position and a retracted stowed position with respect to the at least one movable panel. The first shoe is spring biased about a first pin to its extended use position and the second shoe is spring biased about a second pin to its extended use position. The first shoe includes a stop member to limit movement of the first shoe to a predetermined location and the second shoe includes a stop member to limit movement of the second shoe to a predetermined location.

In the above and further embodiments, the tonneau cover may further comprise: at least one movable panel that includes a first cavity portion sized to receive at least a portion of the first shoe when located in its retracted stowed position and a second cavity portion sized to receive at least a portion of the second shoe when located in its retracted stowed position; the first shoe is pivotable about the first pin between its extended use position and its retracted stowed position and the second shoe is pivotable about the second pin between its extended use position and its retracted stowed position; the at least one movable panel is made from a material that is selected from the group consisting of a rigid material and a flexible material; the at least one movable panel is of a type selected from the group consisting of folding, pivoting, and rolling; each of the first and second shoes are extendable from the underside of the at least one movable panel toward its extended use position of about 1 inch; the at least one movable panel is a plurality of panels, wherein a first panel of the plurality of panels is configured to selectively position over a second panel of the plurality of panels such that the first and second shoes are located on the first panel and face the second panel, and wherein the first and second shoes are engageable with the second panel which moves the first and second shoes from their extended use positions toward their retracted stowed positions; each of the first and second shoes are spring biased to their extended use positions when the at least the portion of the first panel of the plurality of panels is spaced apart from the second panel of the plurality of panels and wherein the first and second shoes are pushed toward their retracted stowed positions against their spring bias when the at least the portion of the first panel of the plurality of panels is moved towards the second panel of the plurality of panels; and at least a portion of the first shoe has a curved surface that is engageable with the second panel of the plurality of panels to move the first shoe toward its retracted stowed position and the second shoe has a curved surface that is engageable with the second panel of the plurality of panels to move the second shoe toward its retracted stowed position.

Another illustrative embodiment of the present disclosure provides a tonneau cover for use on a cargo box of a pick-up truck. The tonneau cover comprises at least one panel and a latching assembly located on the at least one panel. The latching assembly selectively secures and releases the at least one panel. The latching assembly includes at least one shoe. The at least one shoe is configured for moving at least a portion of the latching assembly to release the at least one panel. The at least one shoe is movable between an extended use position and a retracted stowed position with respect to the at least one panel. The at least one shoe is spring biased to its extended use position.

In the above and further embodiments, the tonneau cover may further comprise: the at least one shoe is located on an underside of the at least one panel; the at least one shoe is spring biased about a first pin to its extended use position; the at least one shoe includes a first shoe and a second shoe; the first and second shoes are configured for moving at least a portion of the latching assembly to release the at least one panel, wherein each of the first and second shoes are located on an underside of the at least one panel, and wherein each of the first and second shoes are movable between an extended use position and a retracted stowed position with respect to the at least one panel; the first shoe is spring biased about a first pin to its extended use position and the second shoe is spring biased about a second pin to its extended use position and wherein the first shoe includes a stop member to limit movement of the first shoe to a predetermined location and the second shoe includes a stop member to limit movement of the second shoe to a predetermined location;

and the at least one shoe includes a stop member to limit movement of the at least one shoe to a predetermined location.

Another illustrative embodiment of the present disclosure provides a tonneau cover for use on a cargo box of a pick-up truck. The tonneau cover comprises at least a first movable panel, a second panel, and at least one latching assembly located on the first movable panel. The at least one latching assembly selectively secures and releases the first movable panel. The at least one latching assembly includes at least one shoe. The at least one shoe is movable between an extended use position and a retracted stowed position with respect to the first movable panel. The first movable panel is selectively positionable over the second panel such that the at least one shoe is located on the first movable panel and faces the second panel. The at least one shoe is engageable with the second panel which moves the at least one shoe from its extended use position toward its retracted stowed position.

In the above and further embodiments, the tonneau cover may further comprise: the at least one shoe is spring biased to its extended use position when the at least a portion of the first movable panel is spaced apart from the second panel and, wherein, the at least one shoe is pushed toward its retracted stowed position against its spring bias when the at least the portion of the first movable panel is moved towards the second panel; at least a portion of the at least one shoe has a curved surface that is engageable with the second panel to move the at least one shoe toward its retracted stowed position; and the at least one shoe is spring biased about a pin toward its extended use position.

Additional features and advantages of the pinch latch assembly will become apparent to those skilled in the art upon consideration of the following detailed descriptions exemplifying the best mode of carrying out the pinch latch assembly assembly as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 2 is a perspective underside detail view of an illustrative embodiment of the truck bed cover with a pinch latch assembly that includes latch shoes located in an extended use position;

FIG. 3 is another perspective underside detail view of the truck bed cover showing the pinch latch assembly with the latch shoes located in a stowed position;

FIG. 5 is a perspective cross-sectional view of a portion of the truck bed cover with latch shoes located in their stowed positions;

FIG. 6 is a cross-sectional view of the truck bed cover showing the pinch latch assembly with its latch shoes located in their stowed position;

FIG. 7A is an isolated underside view of the pinch latch assembly with its latch shoes located in their extended use position;

FIG. 7B is a perspective isolated topside view of the pinch latch assembly with its latch shoes located in their extended use position;

Corresponding reference characters indicate corresponding parts throughout the several views. The exemplification set out herein illustrates embodiments of the pinch latch assembly, and such exemplification is not to be construed as limiting the scope of the pinch latch assembly in any manner.

DETAILED DESCRIPTION OF THE DRAWINGS

Figure 1A:
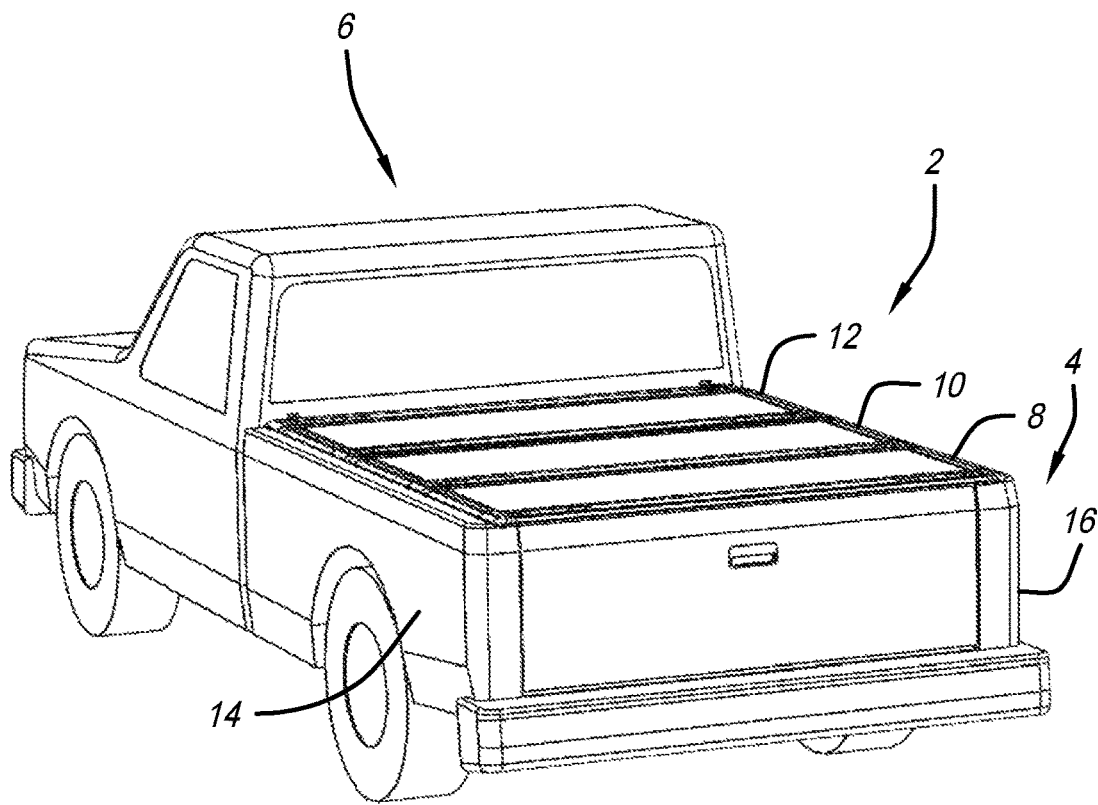
FIG. 1A is a rear perspective view of a pickup truck with a tonneau cover located overtop the cargo box fully unfolded.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a folding or rolling tonneau cover that may be latched to the truck bed sidewalls to secure the tonneau cover in place. In an illustrative embodiment, the latch assembly or assemblies are located on the underside of folding or rolling cover section(s). The latch assembly may include at least one depending latch handle or shoe extending downward from the underside of the cover. The latch handle or shoe is pivotable so that at least a portion of same may be retracted against or into the underside of the cover or cover section. This means less of the latch handle or shoe is extending from the underside of the cover. As a result, when the cover is folded or rolled up to an open bed position, the latch handles or shoes do not require as much space between sections or turns that would otherwise be required if the latch handle or shoe could not otherwise retract.

Under other circumstances, a latch handle or shoe extends from the underside of the cover some distance, illustratively, about an inch. This means that when folding, rolling, or retracting the cover to its open position, there needs to be at least an inch gap between each folded panel or turned section in order to accommodate the latch handle or shoe. Recessing or otherwise moving the latch handle or shoe flat by pivoting or sliding either into or adjacent the underside of the cover, reduces the amount of space the latch handle or shoe extends from the underside of the cover. This results in a tighter folded or rolled cover, which translates into less space the cover occupies when in its stowed position.

In another illustrative embodiment, the tonneau cover of the present disclosure includes a pinch latch assembly similar to that shown in U.S. patent application Ser. No. 16/166,474, entitled "Folding Cover Attachment Systems," filed on Oct. 22, 2018 (hereinafter "the '474 Application), previously incorporated herein by reference. In the present disclosure, rather than having a latch handle such as latch handles 38 and 40 as shown in FIGS. 4A, 4B, 4C, 5, 6A, 6B, 7, and 8 of the '474 Application that always extend from the underside of the cover section, the latch handles in the present disclosure are pivotable with respect to the other portions of the pinch latch assembly. At least a portion of the pinch latch handles may be tucked up into the cover section so less of the latch handle extends downwardly from the cover section.

In a further illustrative embodiment, the latch handles may be configured to engage the topside of an adjacent cover section or portion of the cover, which will act on the latch handle as the cover is being folded, rolled up, or retracted. The latch handle or shoe is freely pivotable with respect to the pinch latch assembly so that when the latch handle or shoe abuts the top surface of an adjacent cover section, that top surface pushes the latch handle towards the pinch latch assembly causing the latch handle to fold and reduce space as previously identified.

In a further illustrative embodiment, the latch handle or shoe may be spring biased to assist extending and/or retracting the latch handle or shoe as desired. Still further, the latch handle or shoe may be a plurality of latch handles or shoes, or a pair of latch handles or shoes. Illustratively, the latch handles or shoes may be drawn together as demonstrated in the previously identified and incorporated patent/applications.

Figure 1B:
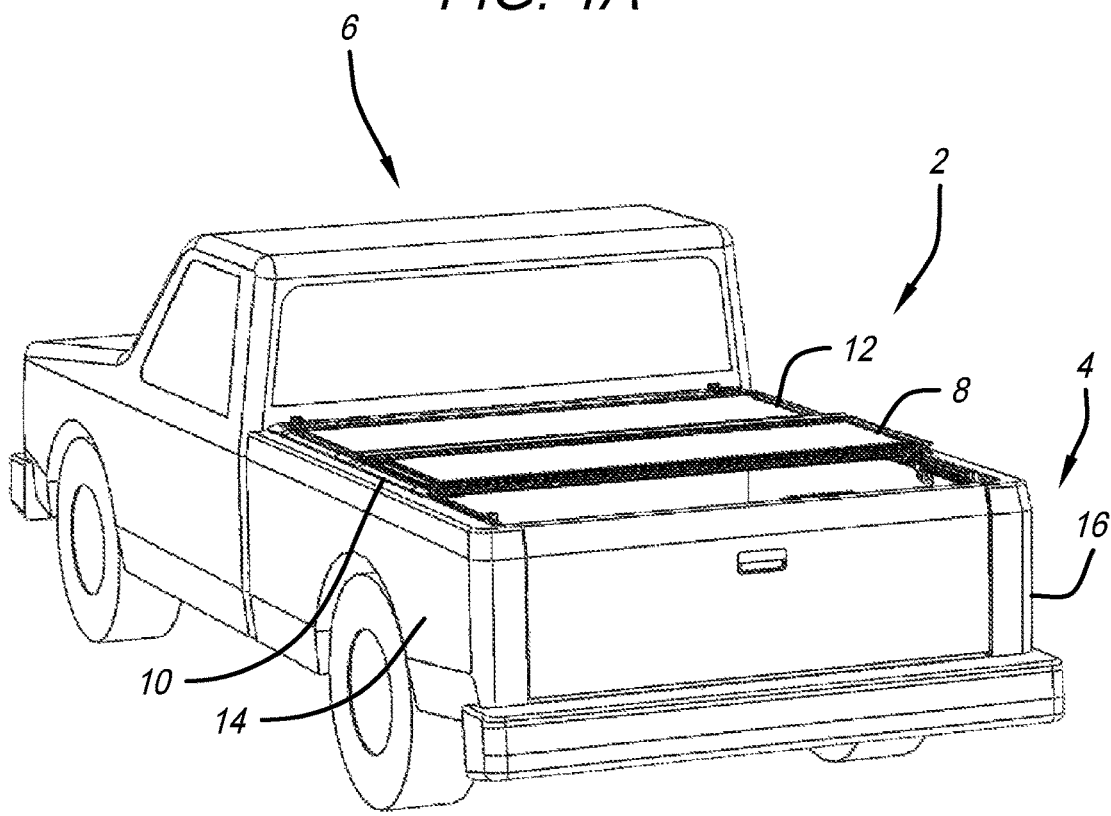
FIG. 1B is another rear perspective view of the pickup truck with the tonneau cover of FIG. 1A, a partially unfolded.
Figure 1C:
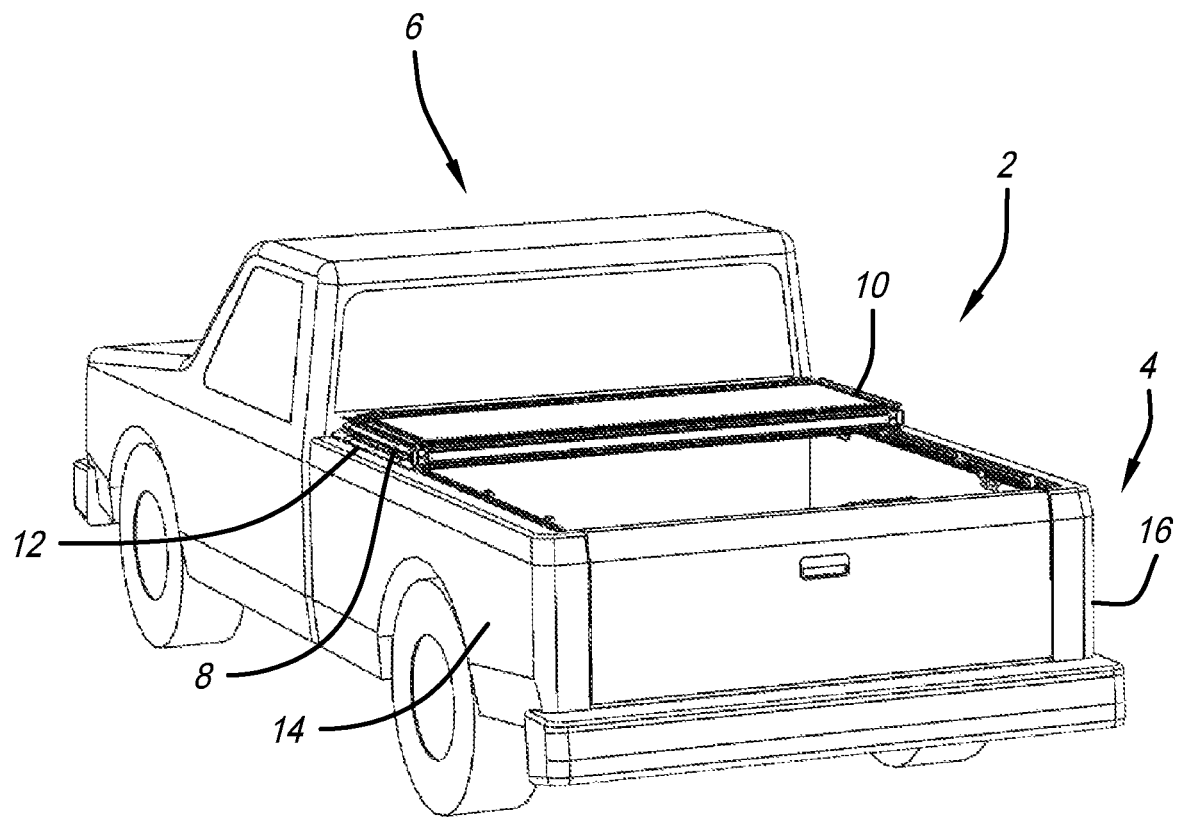
FIG. 1C is another rear perspective view of the pickup truck with the cover of FIG. 1A shown in a further folded position over the cargo box.

An illustrative embodiment of a tonneau truck bed cover 2, attached to truck bed 4 of pickup truck 6, is shown in FIGS. 1A, 1B, and 1C. Truck bed cover 2, shown in these views, illustratively, includes a covering that shrouds truck bed 4, concealing it underneath. It is appreciated that the covering of truck bed cover 2 may be made of fabric, plastic, sailcloth, metal, fiberglass, or other like material. These views further show cover sections 8, 10, and 12.

As shown herein, FIG. 1A depicts truck bed cover 2 unfolded to cover the entire topside of truck bed 4 of pickup truck 6. The view in FIG. 1B differs in that truck bed cover 2 has been partially folded to conceal only a portion of truck bed 4. Lastly, shown in FIG. 1C, is truck bed cover 2 folded completely in order to allow access into truck bed 4. In the illustrated embodiment, section 8 is illustratively foldable with respect to section 10. Section 10 is illustratively foldable with respect to section 12. As shown in FIG. 1B, section 8 is folded on top of section 10. As shown in FIG. 1C, both sections 8 and 10 are folded on top of section 12.

In order to secure cover sections 8, 10, and 12 to truck bed cover 2, latch assemblies are included that allow an operator to selectively latch and unlatch cover sections 8, 10, and 12 of truck bed cover 2 to and from truck bed 4 needed. In illustrative embodiments, the latch assemblies contemplated herein each include a latch member that selectively extends and retracts from a portion of the cover section. Typically, the latch member slides in order to engage or disengage from the sidewall or a rail on the sidewall of the truck bed cover.

In an illustrative embodiment, movement of the latch or latches that move to secure or release the cover sections are accessible underneath the cover sections by at least one latch handle or shoe that is gripable and movable. The latch handle or shoe moves either one or more latches. The latch may be spring-biased so that when one of the cover sections is seated on the truck bed, the latch will be biased towards a latched position. In other words, when the cover section is seated on the truck bed, the latch will engage the side rail or sidewall and latch thereto unless intentionally moved to release the cover section from the rail or sidewall. Examples of such latch assemblies contemplated to be employed in conjunction with the subject matter of the present disclosure are found in the incorporated patent/application references. Each of the pinch latch assemblies shown in these incorporated references may be modified to include the pinch latch handle or shoe as disclosed herein.

A perspective underside detail view of an illustrative embodiment of truck bed cover 2 is shown in FIGS. 2 and 3. The view in FIG. 2 shows cover section 8 with pinch latch assembly 20 depending therefrom and directed towards truck bed 4. A latch member 22 is shown illustratively engaging a rail 24 which may be attached to the interior sidewall 14 (or 16), to secure cover section 8 to truck bed for (see, also, FIGS. 1A, 1B, 1C). Extending downwardly towards the interior of truck bed 4 are latch shoes 26 and 28. Illustratively, latch shoes 26 and 28 may be grasped by a hand and pinched together to actuate latch member 22 (as well as a remote latch on the other side of the cover section) in order to unlatch the cover section. This operation is contemplated to be similar to that accomplished by the pinch latch assemblies disclosed in the incorporated references. The structures and mechanisms to latch and unlatch the cover sections in those incorporated references are contemplated to be embodiments in this disclosure as well. A distinction is that latch shoes 26 and 28, as disclosed herein, may be substituted for the latch handles disclosed in those incorporated references.

As shown in FIG. 2 herein, latch shoes 26 and 28 each include an illustrative curved outer surface 30 and 32, respectively, and stop members 34 and 36, again, respectively. As will be further discussed herein, curved outer surfaces 30 and 32 are configured to engage surfaces of an adjacent cover section to assist pivoting latch shoes 26 and 28, respectively, toward cavities 38 and 38' to receive at least a portion of latch shoes 26 and 28, respectively. Stop members 34 and 36 illustratively limit the amount to which latch shoes 26 and 28, respectively, move to extend latches 26 and 28 to their use positions.

The view in FIG. 3 includes truck bed cover 2, with pinch latch assembly 20 and latch member 22 extended and engaged with rail 24, as shown. The view in FIG. 3 differs from that of FIG. 2 in that latch shoes 26 and 28 have been pivoted in directions 40 and 42, respectively, to their stowed position. Again, the view in FIG. 2 shows latch shoes 26 and 28 extended to their use position, whereas in FIG. 3, latch shoes 26 and 28 have been pivoted toward cavities 38 and 38', respectively, in directions 40 and 42, respectively, to their stowed position. It will be appreciated by the skilled artisan upon reading this disclosure that the latch handles of pinch latch assemblies such as that shown in the incorporated references represent the furthest downward extending structure from the panel or cover section. This may be purposeful so that the pinch latch handles are easy to identify and grasp to unlatch the truck bed cover. Where this becomes a problem, however, is when the cover sections are fully folded up as demonstrated in FIGS. 1A, 1B, and 1C. Conventionally, the hinges and panels incorporate extra space between cover sections to accommodate these extending latch handles. With this present disclosure, the latch handles or shoes 26 and 28 are folded up as shown in FIG. 3, so much of the space that was previously built in between cover sections may now be eliminated. This translates into a thinner folded truck bed cover than what has previously existed.

It is appreciated that in the illustrated embodiments herein, latch shoes 26 and 28 each pivot about a pin so as to rotate between stowed and use positions. The skilled artisan upon reading this disclosure will appreciate that latch shoes 26 and 28 may be pivoted in any direction as needed to move same to reduce spacing requirements between adjacent folded cover sections. Additionally, latch shoes in alternate embodiments may be slid along a track, pushed linearly, or otherwise moved between extended and use positions. Those alternatives are contemplated within the scope of this disclosure as well. Furthermore, latch shoes 26 and 28, as disclosed herein, may be biased via spring or other biasing structure to be either maintained in the downward use position as shown in FIG. 2 or in their retracted stowed position is shown in FIG. 3. Biasing latch shoes 26 and 28 toward their use position is shown in FIG. 2, which means that they are pushed back to their stowed position as shown in FIG. 3 by virtue of engagement with the adjacent folded cover section (see, also, FIGS. 5 and 6). In either instance, latch shoes 26 and 28 are intended to be positioned in their stowed position as shown in FIG. 3 when the cover sections are folded-up (see, also, FIGS. 1B and 1C), but available to be grasped and/or pinched (in the case of multiple latch shoes) by an operator to unlatch the cover section as needed.

Figure 4:
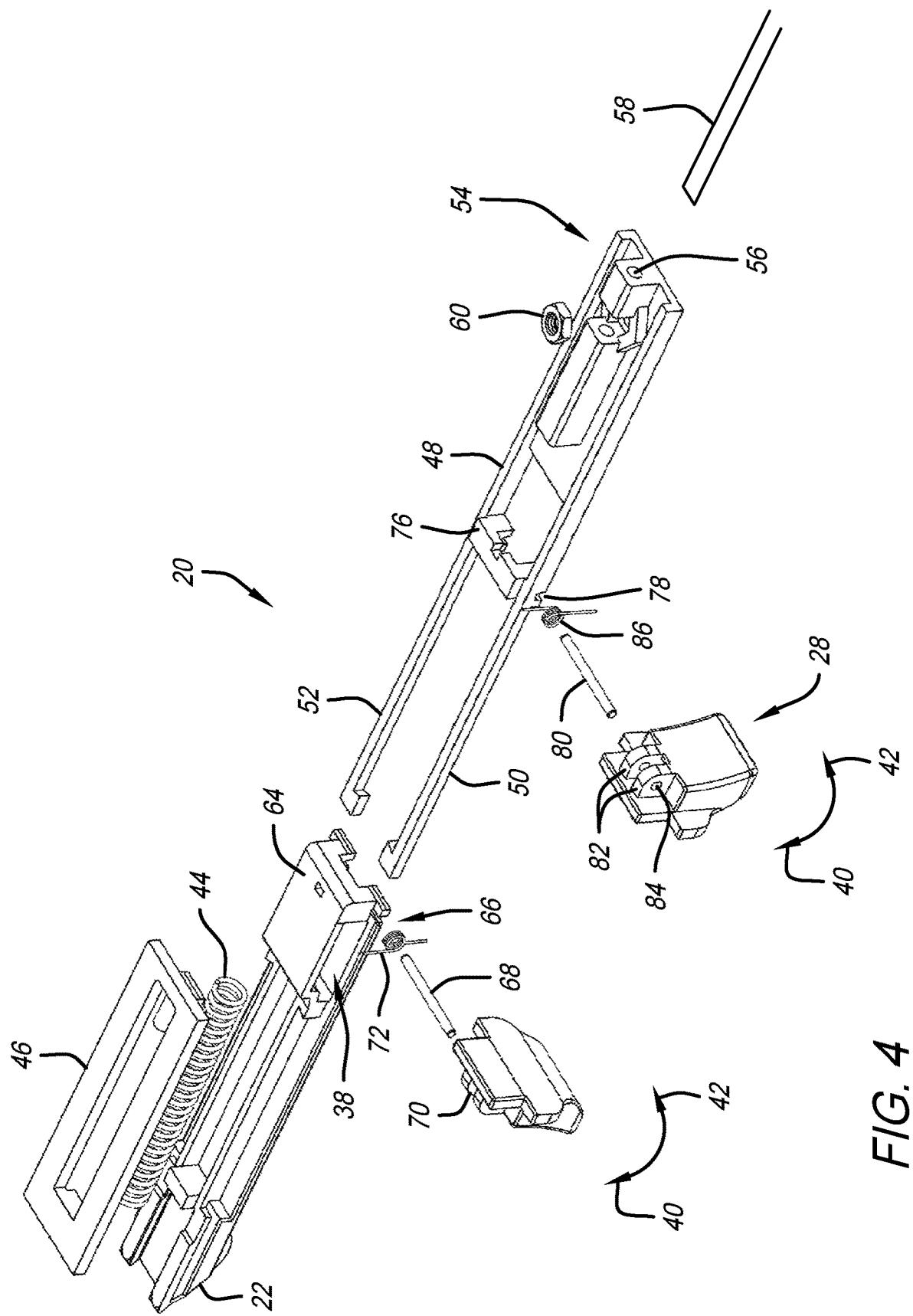
FIG. 4 is an exploded perspective view of the pinch latch assembly.

A perspective exploded view of pinch latch assembly 20 is shown in FIG. 4. This embodiment of a latch assembly includes a latch member 22, a spring 44 that is received in latch member 22, and a latch guide 46 that caps spring 44 on latch member 22. It is appreciated that the manner in which the structures such as spring 44 and latch guide 46 operate are the same or similar to corresponding structures in the previously incorporated references. To that end, inner pinch body 48 includes guide members 50 and 52 that movably engage latch member 22. Located illustratively opposite guide members 50 and 52 is connector assembly 54. Like embodiments in the incorporated references, connector assembly 54 includes a bore 56 that receives connector member 58 which is secured to connector assembly 54 via fastener or other like structure to secure connector member 58 to pinch latch assembly 20. A nut 60, illustratively shown, may attach to a fastener (not shown) to assist in securing connector member 58 to connector assembly 54.

Distinguishing pinch latch assembly 20 from the latch assemblies of the incorporated references are movable latch shoes 26 and 28. Latch member 22 includes a shoe bracket 64 that includes an opening 66 on each side sized to receive pin 68. Latch shoe 26 includes a pin receiver 70 that receives pin 68. Latch shoe 26 is thus secured to latch member 22 via attachment to pin 68, which is attached to shoe bracket 64. It is appreciated that latch shoe 26 is pivotable with respect to shoe bracket 64 on pin 68. A shoe spring 72 may also be disposed on pin 68 and engage both shoe bracket 64 and latch shoe 26 in order to bias latch shoe 26. In the illustrated embodiment, shoe spring 72 is configured to bias latch shoe 26 in direction 42 to the extended use position. Also, in the illustrated embodiment is cavity 38 illustratively located in shoe bracket 64. When latch shoe 26 is moved against bias from shoe spring 72 in direction 40, at least a portion of latch shoe 26 will be located within cavity 38 indicating the stowed position.

With respect to opposing latch shoe 28, a shoe bracket 76 is attached to connector assembly 54. Opening 78 and shoe bracket 76 is sized to receive and hold pin 80 which may be disposed therethrough. Like pin receiver 70 for latch shoe 26, pin receiver 82 includes bores 84 to receive and be held by pin 80 on shoe bracket 76. As is the same with latch shoe 26, latch shoe 28 is movable, this time in direction 40, to its extended use position because of bias from shoe spring 86 engaging shoe bracket 76, pin 80, and latch shoe 28. Also, similar to latch shoe 26, latch shoe 28 will move in direction 42 against the bias of shoe spring 86 in order to move latch shoe 28 to its stowed position. This means that latch shoes 26 and 28 are biased to move to their use position as shown in FIG. 2. This further means that latch shoes 26 and 28 do not need to be manually moved when truck bed cover 2 is unfolded.

To that end, a perspective cross-sectional view of a portion of truck bed cover 2 is shown in FIG. 5. Truck bed cover 2 is folded like that shown in FIG. 1C. This view in FIG. 5, however, demonstrates how having latch shoes 26 and 28 pivoted to their stowed positions reduces the amount of needed space between panel cover sections. As shown herein, cover section 8 is stacked on cover section 12. Cover section 10 is folded on top of cover section 8. Spacing 88, between the top of cover section 12 and underside of cover section 8, is now a reduced distance. This is in contrast to prior embodiments where the latch assemblies latch members did not pivot to such a stowed position. For example, spacing 88 may be an approximately ⅛ inch gap between cover section 8 and cover section 12. In contrast, prior embodiments that lack such stowable latch shoes may have a spacing greater than about 1 inch between cover sections. Such reduced spacing assists in making a more compacted stack of folded cover sections than what was possible by the prior art. Further shown in this view, latch shoe 26 is shown pivoted about pin 68 and located in its stowed position within cavity 38 of shoe bracket 64. Shoe spring 72 is disposed about pin 68 at pin receiver 70. Shoe spring 72 applies a bias against latch shoe 26 to try to keep same in its lowered use position as shown in FIG. 2. However, when folding cover section 8 over onto cover section 12, curved outer surface 30 of latch shoe 26 engages top surface 90 of cover section 12. Top surface 90 will engage curved outer surface 30 causing it to pivot in direction 40 on pin 68 against the bias of shoe spring 72 until latch shoe 26 is located in its stowed position in cavity 38 as shown herein.

The same is the case with latch shoe 28. It is shown secured to pin 80 and located in cavity 38' as its stowed position. Shoe spring 86 (see, also, FIG. 4) also biases latch shoe 28 to its use position in direction 40. But, when cover section 8 is folded onto cover section 12, curved outer surface 32 of latch shoe 28 engages top surface 90 of cover section 12, which pushes on latch shoe 28 pivoting same about pin 80, and against the bias of shoe spring 86. This moves latch shoe 28 in direction 42 to its stowed position in cavity 38' as shown herein in FIG. 5. The net effect is that when cover section 8 (or any other cover section that includes a latch assembly like pinch latch assembly 20) is in an unfolded position, latch shoes 26 and 28 are pivoted downward towards their use position automatically making themselves available to be gripped by an operator to move latch member 22. But, when the cover sections are folded, latch shoes 26 and 28 will be folded up into their cover section without any additional effort being made by the operator. Latch shoes 26 and 28 will engage top surface 90 of cover section 12 by virtue of folding cover section 28 over cover section 12 to move latch shoes 26 and 28 recessing same in cavity 38 and 38', respectively.

A sectional view of a truck bed cover similar to that of FIG. 5 is shown in FIG. 6. It is further appreciated herein how spacing 88 may be reduced by having latch shoes 26 and 28 recessed in cavities 38 and 38', respectively, as shown. It is further appreciated in this view how curved outer surfaces 30 and 32 may be acted on by top surface 90 in cover section 12 to pivot shoes about pins 68 and 80, respectively, to move latch shoes 26 and 28 to their respective stowed positions. By reducing the spacing needed to accommodate shoes 26 and 28 to move to their stowed position, the overall thickness of stacked cover sections 8, 10, and 12, as indicated by length 92, is substantially reduced when compared to a length otherwise required if latch shoes 26 and 28 were maintained in their used position (see FIG. 2).

Perspective isolated underside and topside views of pinch latch assembly 20 are shown in FIGS. 7A and 7B, respectively. These figures depict assembled views of pinch latch assembly 20. The views in FIGS. 7A and 7B further depict pinch latch assembly 20 in its assembled form with latch shoes 26 and 28 lowered in their use position. As shown, pins 68 and 80 are located in their respective openings 66 and 78 of shoe brackets 64 and 76, respectively. Particularly with respect to latch shoe 28 (though the same is also the case with latch shoe 26), pin 80 is disposed through pin receiver 82 where also shoe spring 86 is located, to provide a bias force toward the use position as shown. These views also show latch guide 46, latch member 22, and inner pinch body 48. These views also show the utilities of stop members 34 and 36 of latch shoes 26 and 28, respectively. Illustratively, stop members 34 and 36 engage guide members 50 and 52, respectively, when the bias of shoe springs 72 and 86 act on latch shoes 26 and 28 respectively, biasing to their use positions. By limiting the distance latch shoes 26 and 28 may move by engagement between stop members 34/guide number 50 and stop member 36/guide number 52, respectively, latch shoes 26 and 28 are able to repeatably move to the same use position when not acted upon by another external force such as cover section 12.

Figure 8A:
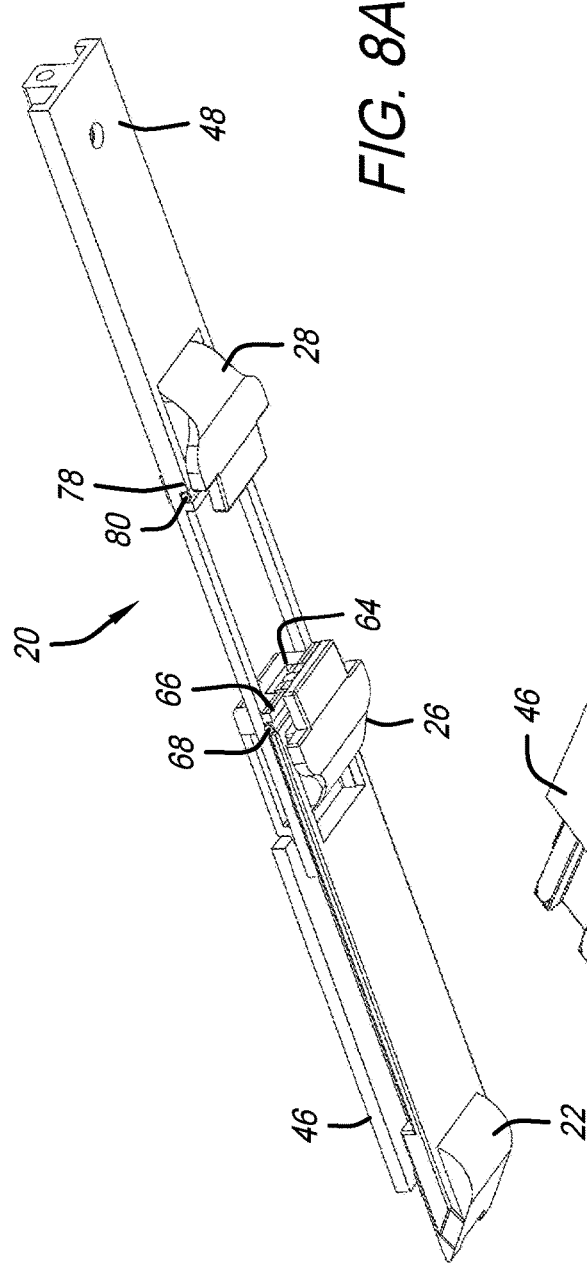
FIG. 8A is another perspective isolated view of the underside view of the pinch latch assembly with its latch shoes located in their stowed position.
Figure 8B:
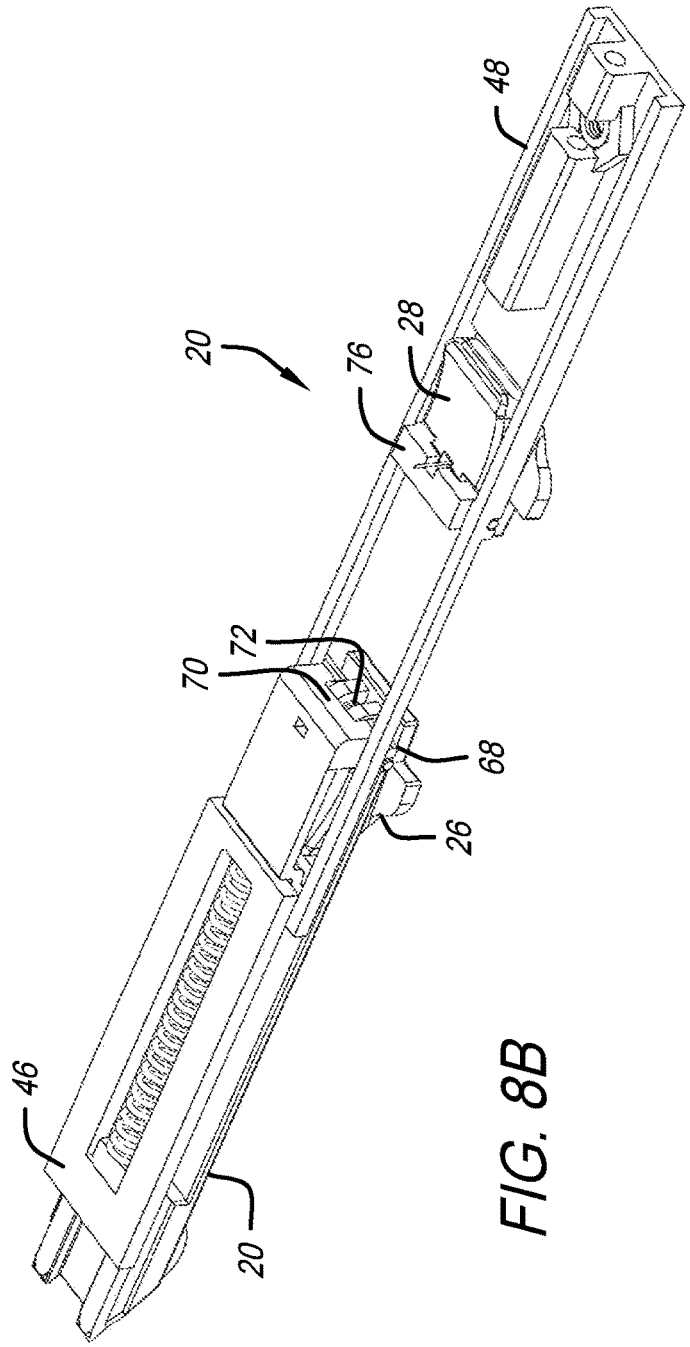
FIG. 8B is another perspective isolated topside view of the pinch latch assembly with its latch shoes located in their stowed position.

Additional perspective isolated underside and topside views of pinch latch assembly 20 are shown in FIGS. 8A and 8B, respectively. These views show latch guide 46, latch member 22, inner pinch body 48, and latch shoes 26 and 28 similar to FIGS. 7A and 7B. In contrast though, latch shoes 26 and 28 are shown in their recessed stowed positions. These views further assist showing pins 68 and 80 located in openings 66 and 78, respectively. Comparing FIGS. 8A and 8B to FIGS. 7A and 7B, it is appreciated that latch shoes 26 and 28 pivot about pins 68 and 80, respectively, to move latch pins 26 and 28 into their stowed positions. The views in FIGS. 8A and 8B also help further depict how pin receiver 70 (like pin receiver 82) of latch shoe 26 receives pin 68 and spring 72, which biases latch shoe 26. It is appreciated in this embodiment that to position latch shoes 26 and 28 in their used positions, an external force operates in contravention to the bias of spring 72 (as well as spring 86 for latch shoe 28). It is appreciated that in other embodiments, other springs may be used to bias latch shoes in different directions as needed by the configuration of the bed cover. For example, under other circumstances, it may be beneficial for the spring bias to move the latch shoes to their stowed position requiring an external force to move them to their use position. Such alternatives are contemplated within the scope of this disclosure.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A tonneau cover for use on a cargo box of a pick-up truck, the tonneau cover comprising:
   at least one movable panel; and
   a latching assembly located on the at least one movable panel;
   wherein the latching assembly selectively secures and releases the at least one movable panel;
   wherein the latching assembly includes a first shoe and a second shoe;
   wherein the first and second shoes are configured for moving at least a portion of the latching assembly to release the at least one movable panel;
   wherein each of the first and second shoes are located on an underside of the at least one movable panel;
   wherein each of the first and second shoes are pivotable between an extended use position and a retracted stowed position with respect to the at least one movable panel;
   wherein the first shoe is spring biased about a first pin to its extended use position and the second shoe is spring biased about a second pin to its extended use position; and
   wherein the first shoe includes a stop member to limit movement of the first shoe to a predetermined location and the second shoe includes a stop member to limit movement of the second shoe to a predetermined location.

2. The tonneau cover of claim 1, wherein the at least one movable panel includes a first cavity portion sized to receive at least a portion of the first shoe when located in its retracted stowed position and a second cavity portion sized to receive at least a portion of the second shoe when located in its retracted stowed position.

3. The tonneau cover of claim 1, wherein the first shoe is pivotable about the first pin between its extended use position and its retracted stowed position and the second shoe is pivotable about the second pin between its extended use position and its retracted stowed position.

4. The tonneau cover of claim 1, wherein the at least one movable panel is made from a material that is selected from the group consisting of a rigid material and a flexible material.

5. The tonneau cover of claim 1, wherein the at least one movable panel is of a type selected from the group consisting of folding, pivoting, and rolling.

6. The tonneau cover of claim 1, wherein each of the first and second shoes are extendable from the underside of the at least one movable panel toward its extended use position of about 1 inch.

7. The tonneau cover of claim 1, wherein the at least one movable panel is a plurality of panels, wherein a first panel of the plurality of panels is configured to selectively position over a second panel of the plurality of panels such that the first and second shoes are located on the first panel and face the second panel, and wherein the first and second shoes are engageable with the second panel which moves the first and second shoes from their extended use positions toward their retracted stowed positions.

8. The tonneau cover of claim 7, wherein each of the first and second shoes are spring biased to their extended use positions when the at least the portion of the first panel of the plurality of panels is spaced apart from the second panel of the plurality of panels, and wherein the first and second shoes are pushed toward their retracted stowed positions against their spring bias when the at least the portion of the first panel of the plurality of panels is moved towards the second panel of the plurality of panels.

9. The tonneau cover of claim 8, wherein at least a portion of the first shoe has a curved surface that is engageable with the second panel of the plurality of panels to move the first shoe toward its retracted stowed position and the second shoe has a curved surface that is engageable with the second panel of the plurality of panels to move the second shoe toward its retracted stowed position.

10. A tonneau cover for use on a cargo box of a pick-up truck, the tonneau cover comprising:
at least one panel; and
a latching assembly located on the at least one panel;
wherein the latching assembly selectively secures and releases the at least one panel;
wherein the latching assembly includes at least one shoe;
wherein the at least one shoe is configured for moving at least a portion of the latching assembly to release the at least one panel;
wherein the at least one shoe is pivotable between an extended use position and a retracted stowed position with respect to the at least one panel;
wherein the at least one shoe is spring biased to its extended use position.

11. The tonneau cover of claim 10, wherein the at least one shoe is located on an underside of the at least one panel.

12. The tonneau cover of claim 10, wherein the at least one shoe is spring biased about a first pin to its extended use position.

13. The tonneau cover of claim 10, wherein the at least one shoe includes a first shoe and a second shoe.

14. The tonneau cover of claim 13, wherein the first and second shoes are configured for moving at least a portion of the latching assembly to release the at least one panel, wherein each of the first and second shoes are located on an underside of the at least one panel, and wherein each of the first and second shoes are movable between an extended use position and a retracted stowed position with respect to the at least one panel.

15. The tonneau cover of claim 13, wherein the first shoe is spring biased about a first pin to its extended use position and the second shoe is spring biased about a second pin to its extended use position and wherein the first shoe includes a stop member to limit movement of the first shoe to a predetermined location and the second shoe includes a stop member to limit movement of the second shoe to a predetermined location.

16. The tonneau cover of claim 10, wherein the at least one shoe includes a stop member to limit movement of the at least one shoe to a predetermined location.

17. A tonneau cover for use on a cargo box of a pick-up truck, the tonneau cover comprising:
at least a first movable panel and a second panel; and
at least one latching assembly located on the first movable panel;
wherein the at least one latching assembly selectively secures and releases the first movable panel;
wherein the at least one latching assembly includes at least one shoe;
wherein the at least one shoe is movable between an extended use position and a retracted stowed position with respect to the first movable panel;
wherein the first movable panel is selectively positionable over the second panel such that the at least one shoe is located on the first movable panel and faces the second panel; and
wherein the at least one shoe is engageable with the second panel which moves the at least one shoe from its extended use position toward its retracted stowed position.

18. The tonneau cover of claim 17, wherein the at least one shoe is spring biased to its extended use position when the at least a portion of the first movable panel is spaced apart from the second panel and wherein the at least one shoe is pushed toward its retracted stowed position against its spring bias when the at least the portion of the first movable panel is moved towards the second panel.

19. The tonneau cover of claim 17, wherein at least a portion of the at least one shoe has a curved surface that is engageable with the second panel to move the at least one shoe toward its retracted stowed position.

20. The tonneau cover of claim 17, wherein the at least one shoe is spring biased about a pin toward its extended use position.

* * * * *